US009446555B2

(12) United States Patent
Hupp, Sr.

(10) Patent No.: US 9,446,555 B2
(45) Date of Patent: Sep. 20, 2016

(54) HOT WEDGE WELDING MACHINE AND METHOD OF OPERATION

(71) Applicant: MILLER WELDMASTER CORPORATION, Navarre, OH (US)

(72) Inventor: Timothy M. Hupp, Sr., Canton, OH (US)

(73) Assignee: Miller Weldmaster Corporation, Navarre, OH (US)

( * ) Notice: Subject to any disclaimer, the term of this patent is extended or adjusted under 35 U.S.C. 154(b) by 81 days.

(21) Appl. No.: 14/105,425

(22) Filed: Dec. 13, 2013

(65) Prior Publication Data

US 2014/0305586 A1    Oct. 16, 2014

Related U.S. Application Data

(60) Provisional application No. 61/812,034, filed on Apr. 15, 2013.

(51) Int. Cl.
*B29C 65/00* (2006.01)
*B29C 65/20* (2006.01)
*B29C 65/30* (2006.01)

(52) U.S. Cl.
CPC .......... *B29C 65/20* (2013.01); *B29C 65/2084* (2013.01); *B29C 65/305* (2013.01); *B29C 66/1122* (2013.01); *B29C 66/43* (2013.01); *B29C 66/81465* (2013.01); *B29C 66/81811* (2013.01); *B29C 66/83413* (2013.01); *B29C 66/845* (2013.01); *B29C 66/91212* (2013.01); *B29C 66/91231* (2013.01); *B29C 66/91421* (2013.01); *B29C 66/91431* (2013.01); *B29C 66/91641* (2013.01); *B29C 66/961* (2013.01); *B29C 66/9674* (2013.01); *B29C 66/9672* (2013.01)

(58) Field of Classification Search
None
See application file for complete search history.

(56) References Cited

U.S. PATENT DOCUMENTS

2012/0110956 A1*   5/2012   Miller .............................. 53/440

FOREIGN PATENT DOCUMENTS

GB              1158228 A    *   7/1969

* cited by examiner

*Primary Examiner* — John Goff
(74) *Attorney, Agent, or Firm* — Sand & Sebolt

(57) ABSTRACT

The invention relates to providing a hot wedge welding machine which may eliminate the thermal dampening that occurs to a welding element when the material to be welded is first introduced into the welding machine. The invention relates to cooling the welding element to stimulate a heating system to heat the welding element to the desired temperature. The artificial cooling stress provided by a cooling system is removed generally at the same time genuine cooling stress of the material is applied to the welding element. This results in the welding element maintaining a consistent temperature when the material is introduced into the welding machine.

7 Claims, 4 Drawing Sheets

HOT WEDGE WELDING MACHINE AND METHOD OF OPERATION

CROSS-REFERENCE TO RELATED APPLICATION

This application claims priority from U.S. Provisional Application Ser. No. 61/812,034, filed Apr. 15, 2013, the disclosure of which is incorporated herein by reference.

BACKGROUND OF THE INVENTION

1. Technical Field

This invention relates to a welding machine. More particularly, this invention relates to a hot wedge welding machine for connecting and welding together at least two layers of material. Specifically, this invention relates to a hot wedge welding machine which incorporates a cooling system for use in conjunction with the internal heating system such that the wedge is heated to the desired temperature in a pre-stressed environment to prepare for a cold material to be inserted therein and absorb the additional heat from the wedge.

2. Background Information

Hot wedge welding machines all suffer from a problem which relates to maintaining the desired temperature of the welding element when a material to be welded enters the machine. Given that welding elements must remain in a particular temperature range to ensure a proper seal, thermal dampening occurs when the material to be welded abuts the preheated welding element. This lowers the temperature of the welding element, which in turn stimulates a heating system to increase the current to the welding element to compensate. Oftentimes, this sudden increase of current overcompensates, sending the temperature of the welding element from below the desired range to above the desired range. Heating system shuts off the extra current, which then may send the temperature of the welding element back below the desired range. Eventually, a thermal equilibrium is reached, but only after a lengthy section of unusable and poorly welded material is generated during the oscillation between the wedge being too cold or too hot for form a usable weld.

Therefore, a need exists in the art to provide a hot wedge welding system which may eliminate the above described scenario and allow the welding element to form a usable weld in the proper thermal range when the material is first introduced into the welding machine.

SUMMARY

In one aspect, the invention may provide a method comprising: expelling a stream of fluid proximate a welding element to cool the welding element; heating the welding element to a desired temperature while the stream of fluid is being expelled proximate the welding element; and terminating the expelling of the stream of fluid when welding is initiated.

In another aspect, the invention may provide a method of hot wedge welding a material comprising the steps of: cooling a welding element while simultaneously heating the welding element to a desired temperature; and terminating the cooling when the welding element is welding the material.

In another aspect, the invention may provide a hot wedge welding machine comprising: a welding element; a heating system for heating the welding element to a desired temperature; a sensor connected to the welding element and the heating system, wherein the sensor configured to sense a current temperature of the welding element and provide the current temperature to the heating system; and a cooling system for cooling the welding element.

BRIEF DESCRIPTION OF THE SEVERAL VIEWS OF THE DRAWINGS

One or more preferred embodiments that illustrate the best mode(s) are set forth in the drawings and in the following description. The appended claims particularly and distinctly point out and set forth the invention.

The accompanying drawings, which are incorporated in and constitute a part of the specification, illustrate various example methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

Similar numbers refer to similar parts throughout the drawings.

DETAILED DESCRIPTION

A hot wedge welding machine and method of operation is shown in FIGS. 1-4 and referred to generally herein as welding machine 1. Various non-novel features found in the prior art relating to hot wedge welding are not discussed herein. The reader will readily understand the fundamentals of hot wedge welding are well within the prior art and readily understood by one familiar therewith.

Figure 1:
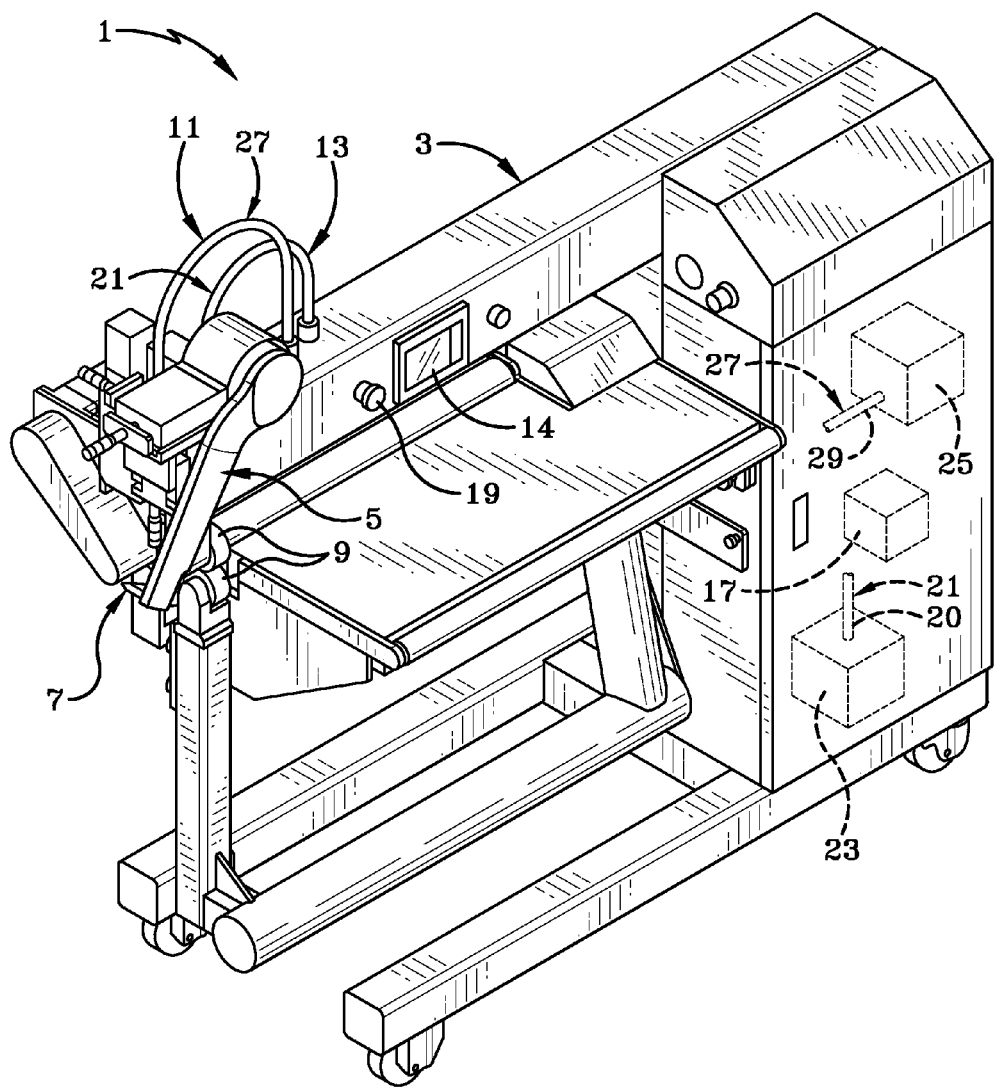
FIG. 1 is a perspective view of an embodiment of a welding machine of the present invention.
Figure 2:
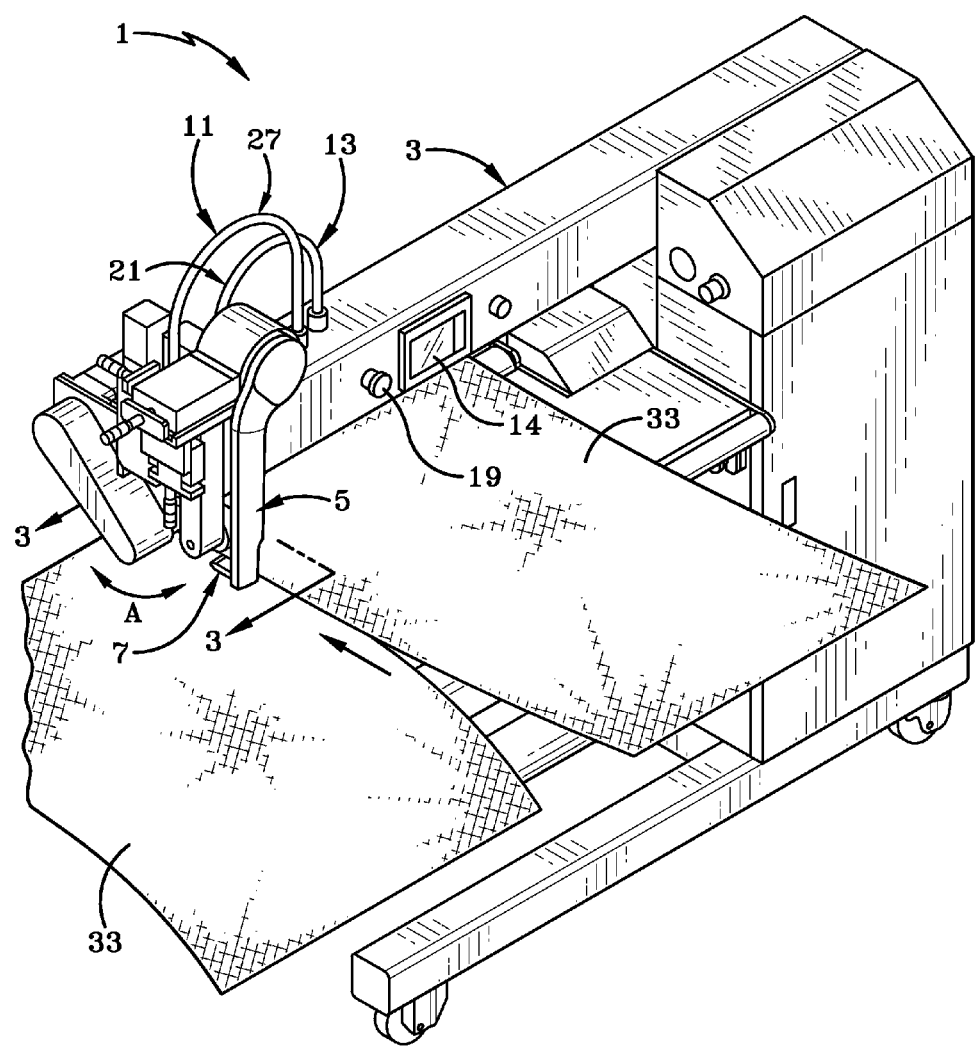
FIG. 2 is another perspective view thereof.
Figure 3:
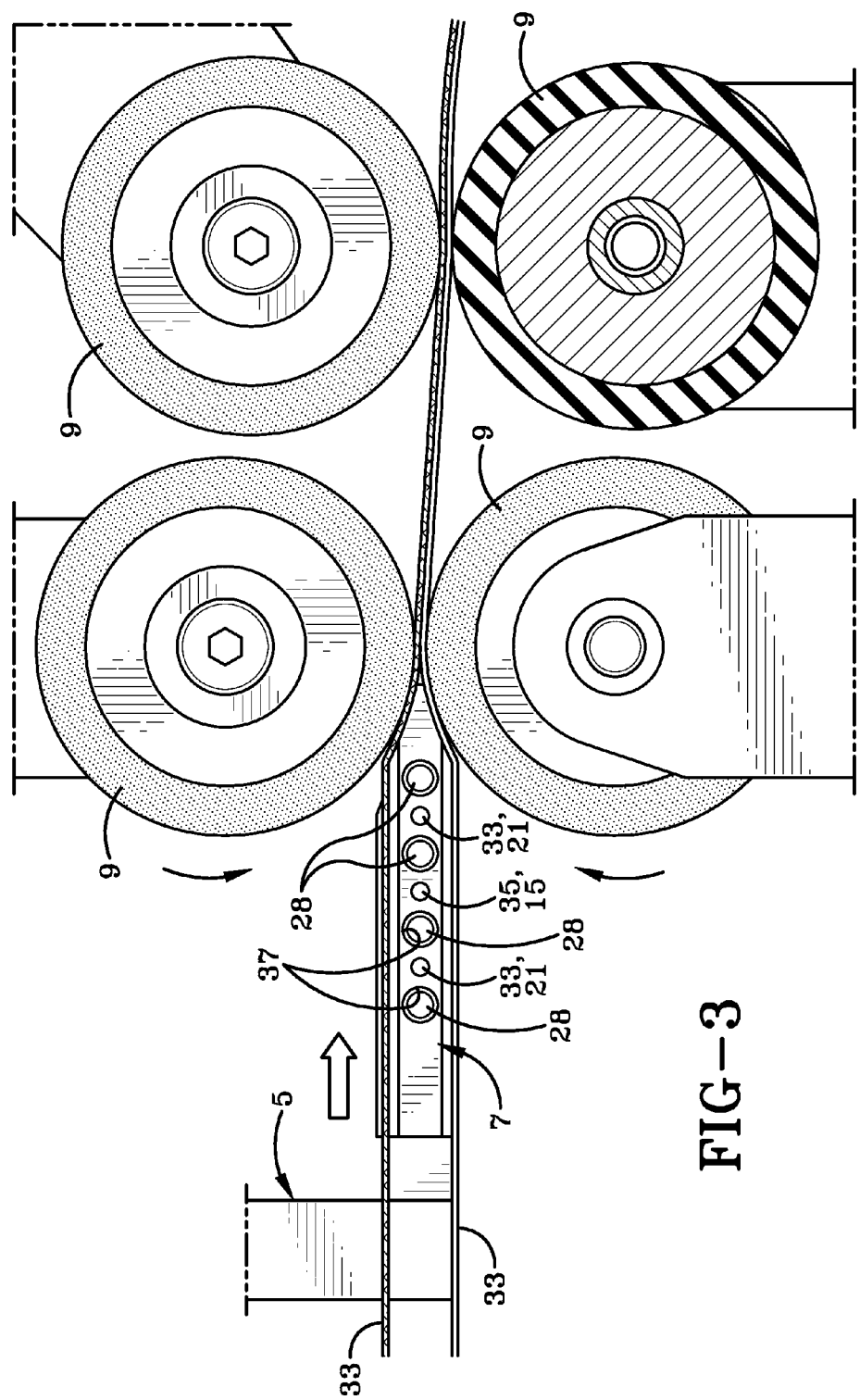
FIG. 3 is a cross-sectional view taken along line 3-3 of FIG. 2.

As shown in FIGS. 1-3, welding machine 1 includes a main body 3 having an arm 5 attached thereto and movable between a first position (FIG. 1) and a second position (FIG. 2) as shown in the directions of Arrow A of FIG. 2. Attached to one end of arm 5 is a welding element 7 which cooperates with a series of rollers 9 to weld two layers of a material 33 (FIG. 2). Welding machine 1 includes a heating system 11 for heating welding element 7 to a desired temperature. Welding machine 1 further includes a sensor 15 connected to welding element 7, heating system 11, and a display panel 14 disposed on main body 3. Display panel 14 may include an interface, such as a touchscreen interface coupled with a display. Sensor 15 is configured to sense a current temperature of welding element 7 and provide the current temperature to heating system 11 and display panel 14. Display panel 14 displays the current temperature of welding element 7 to the user. Heating system 11 receives the current temperature from sensor 14 and determines whether more heating is necessary or if a desired temperature has been reached. Welding machine 1 further includes system logic and a processing unit for use in controlling the overall process used herein and deciding whether to continue or halt the heating of welding element 7. As commonly understood in the art, circuitry, logic, and a processing unit are used in various configurations to control the welding process.

Figure 4:
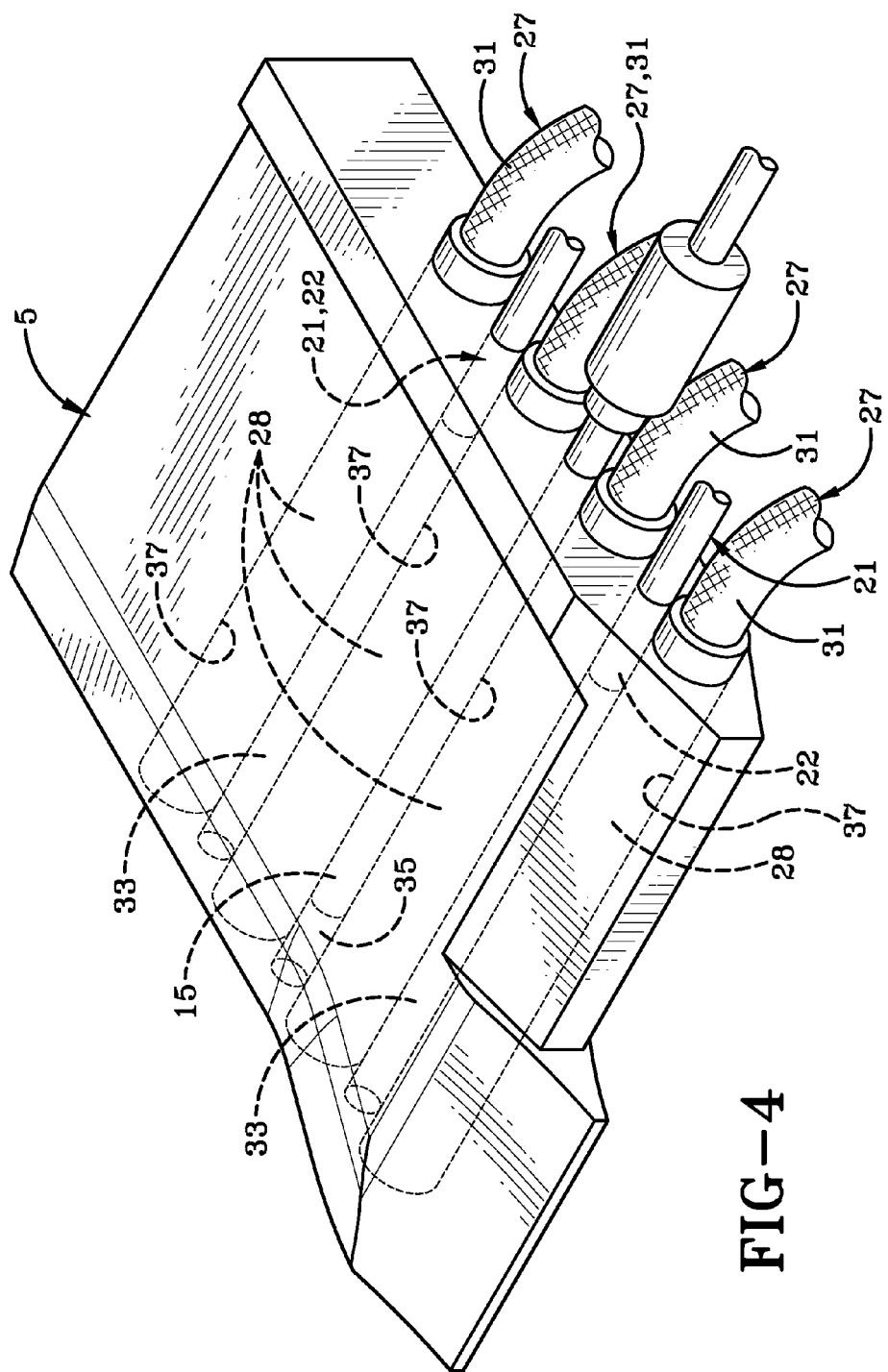
FIG. 4 is a perspective view of a welding element of the present invention.

As shown in FIGS. 1, 3, and 4, heating system 11 includes a power supply 25 disposed in main body 3 and configured to provide an electrical power supply to welding element 7 by way of a conduit 27. Conduit 27 extends from a first end 29 connected to power supply 25 to a second end 31 connected to welding element 7. Conduit 27 terminates in a heating element 29 disposed in a channel 37 defined by welding element 7. Heating element 29 may be a thermal resistance coil or any other method of converting electricity into heat. The electrical power provided by power supply 25 heats welding element 7 internally by way of heating element 29 disposed in channel 37.

As shown in FIGS. 3 and 4, sensor 15 is disposed in a channel 35 defined by welding element 7. Sensor 15 is used for monitoring the temperature of welding element 7 and providing the temperature information to the system logic of heating system 11 and display panel 14. The wires required for implementing sensor 15 may be disposed in conduit 27 along with the wires required for implementing heating element 28. Combining wires into conduit 27 facilitates a streamlined wire containment system and prevents arm 5 from moving into a wire or getting tangled therein.

Welding machine 1 further includes a cooling system 13 for cooling welding element 7. In the preferred embodiment, cooling system 13 includes a tube 21 having a first end 20 connected to an air supply 23 disposed in main body 3. Tube 21 also includes a second end 22 disposed inside a channel 33 defined by welding element 7 (FIG. 4). Tube 21 is configured to provide a flow of air from air supply 23 to welding element 7, and continuously blow the air through channel 33. The cooling is provided by the air flowing through channel 33 of welding element 7. The flow rate of the air through tube 21 is controllable via a knob 19 provided on main body 3, whereby knob 19 is turned to increase or decrease the flow rate and in turn provide increased cooling or decreased cooling. A user may use cooling system 13 to cool heated welding element 7 below the desired temperature to activate additional heating of welding element 7 back to the desired temperature via heating system 11. Welding machine 1 may be configured to activate the cooling of cooling system 13 when arm 5 is in the first position, and terminate the cooling of cooling system 13 when welding is initiated by movement of arm 5 into the second position.

Welding machine 1 may include a controller 17 disposed in main body 3 and movable between and first state and a second state. Moving controller 17 from the second state to the first state activates cooling of the heated welding element 7 via cooling system 13. Conversely, moving controller 17 from the first state to the second state terminates the cooling of the heated welding element 7. Welding machine 1 moves arm 5 from the first position to the second position when controller 17 is moved to the second state. Conversely, controller 17 moves arm 5 from the second position to the first position when controller 17 is moved to the first state.

Controller 17 may be formed as or utilize a solenoid or a pneumatic valve. Further, controller 17 may control a pneumatic air line for both actuating arm 5 and cooling system 13. As such, air supply 23 may be interconnected to supply and control arm 5 in a pneumatic manner in addition to providing the flow of air for cooling system 13. Thus, by allowing controller 17 to be switchable between a first state and a second state, welding machine 1 may be configured such that when controller 17 is in the first state, arm 5 is in the first position and cooling system 13 is cooling welding element 7. When welding machine 1 is configured in such a way, it follows that when controller 17 switches to the second state, cooling system 13 terminates cooling and arm 5 moves to the second position. By connecting cooling system 13 and arm 5 to the controller, the user is relieved of the task of initiating and terminating cooling system 13 as these steps are performed automatically when the user initiates or terminates welding.

In operation, a user may determine a proper flow rate of the stream of air by heating welding element 7 to a desired temperature. The user then welds a test sample of material 33 with welding machine 1 to determine how low the temperature of welding element 7 drops due to the test sample. The test sample thermally stresses welding element 7 and signifies how welding element 7 will react when material 33 is directed therethrough during genuine welding.

The user monitors the drop in temperature on display panel 14 during the welding of the test sample. The user then notes this low temperature and removes the test sample from welding machine 1. For example, welding element 7 may cool from a temperature of 400° F. to a temperature of 350° F. Thereafter, the user allows welding element 7 to heat back up to the desired temperature. When welding element 7 has reheated to the desired temperature (e.g. 400° F.), the user then manipulates knob 19 to increase the air flow to welding element 7 from air supply 23 through tube 21 until the temperature drops generally to the low temperature noted previously. In this example, welding element 7 decreases in temperature from 400° F. to 350° F. due to the air flow from air supply 23. Meanwhile, heating system 11 increases heat output to welding element 7 to compensate for this increased thermal stress from air supply 23. Thereafter, due to the increased heat output from heating system 11, welding element 7 heats back up to the desired temperature (from 350° F. to 400° F.) while cooling system 13 is simultaneously cooling welding element 7 with the configured flow rate of air from air supply 23. This stresses the overall system and stimulates welding machine 1 into pre-compensating for the thermal dampening which occurs when material 33 is inserted into welding machine 1. As such, welding machine 1, and in particular, welding element 7 is pre-stressed thermally in anticipation of material 33 being received therein.

In one embodiment, when welding is initiated by moving arm 5 from the first position to the second position, welding machine 1 automatically shuts off cooling system 13 in anticipation of material 33 abutting welding element 7. The artificial cooling stress provided by cooling system 13 is removed generally at the same time genuine cooling stress of material 33 is applied to welding element 7. This results in welding element 7 maintaining a consistent temperature when material 33 is introduced into welding machine 1. As such, welding machine 1 applies a consistent and usable weld at the very start of the welding process.

In another embodiment, welding machine 1 shuts off cooling system 13 when the desired temperature of welding element 7 is reached. Welding machine may be configured in such a way to ensure cooling system 13 is terminated before welding. By shutting off cooling system 13 when the desired temperature of welding element 7 is reached, heating system 11 senses welding element 7 is beyond the desired temperature and similarly terminates heating welding element 7. This allows welding element 7 to be in a neutral state free of any cooling or heating from controller 17.

In yet another embodiment, welding machine 1 shuts off cooling system 13 after initiating welding of material 33 by way of welding element 7. In this embodiment, there may be a second temperature which is used for determining when to shut off cooling system 13. For example, if welding element 7 is at 400° F., cooling system 13 is engaged, and welding has been initiated, controller 17 may be configured to wait halting cooling system 13 until welding element 7 drops to 390° F., for example. This allows for an even transition from the thermal stress applied by cooling system 13 and the cooling stress applied by material 33.

"Logic," "logic circuitry," or "logic circuit," as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

In the foregoing description, certain terms have been used for brevity, clearness, and understanding. No unnecessary limitations are to be implied therefrom beyond the requirement of the prior art because such terms are used for descriptive purposes and are intended to be broadly construed.

While the present invention has been described in connection with the preferred embodiments of the various figures, it is to be understood that other similar embodiments may be used or modifications and additions may be made to the described embodiment for performing the same function of the present invention without deviating there from. Therefore, the present invention should not be limited to any single embodiment, but rather construed in breadth and scope in accordance with the recitation of the appended claims.

The invention claimed is:

1. A method of welding a material using a welding element comprising the steps of:
    locating the welding element on an arm, said arm being movable between a first position and a second position;
    moving a controller from a second state to a first state;
    moving the arm from the second position to the first position when the controller moves from the second state to the first state;
    initiating expelling of a stream of fluid proximate the welding element when the controller moves from the second state to the first state;
    cooling the welding element with the expelled stream of fluid prior to initiating welding of the material;
    simultaneously heating the welding element to a desired temperature prior to initiating welding of the material and while the stream of fluid continues to be expelled proximate the welding element and is cooling the welding element;
    positioning the simultaneously cooled and heated welding element proximate the material to be welded;
    initiating welding of the material with the welding element;
    moving the arm from the first position to the second position when welding is initiated;
    moving the controller from the first state to the second state when the arm is moved from the first position to the second position; and
    terminating the expelling of the stream of fluid when the controller moves from the first state to the second state; and
    wherein the method further includes the welding of the material with the heated welding element after the expelling of the stream of fluid is terminated.

2. The method of claim 1, further comprising the step of manually adjusting a flow rate of the stream of fluid.

3. The method of claim 1, further comprising the steps of:
    disposing an end of a tube inside the welding element; and
    expelling the stream of fluid through the tube and into the welding element to cool the welding element.

4. A method of hot wedge welding a material comprising the steps of:
    initiating cooling a welding element while simultaneously heating the welding element to a desired temperature prior to initiating welding;
    terminating the cooling of the welding element;
    initiating hot wedge welding of the material with the welding element;
    and wherein the method further includes continuing to weld the material while the welding element continues to be heated and until welding of the material is completed; and wherein the step of terminating the cooling occurs when the welding element moves from a first position to a second position to weld the material; and the step of initiating the cooling occurs when the welding element moves from the second position to the first position.

5. The method of claim 4, further comprising the step of:
    coupling a cooling system used for initiating and terminating the cooling the welding element with a welding system used for initiating and terminating welding the material;
    wherein the coupling facilitates terminating the cooling when the welding system initiates welding the material; and
    wherein the coupling facilitates initiating the cooling when the welding system terminates welding the material.

6. The method of claim 4, further comprising the steps of:
    expelling a stream of fluid proximate the welding element to cool the welding element; and
    passing an electrical current through the welding element to heat the welding element.

7. A method of hot wedge welding a material in a welding machine; said method comprising steps of:
    placing a test sample of the material to be welded in the welding machine;
    heating a welding element on the welding machine to a first temperature;
    positioning the heated welding element adjacent the test sample;

welding the test sample using the welding element;
measuring a second temperature of the welding element after welding of the test sample;
deducting the second temperature from the first temperature to determine a drop in temperature of the welding element;
removing the test sample from the welding machine;
heating the welding element back up to the first temperature;
activating a cooling system on the welding machine;
cooling the heated welding element back to the second temperature using the cooling system;
raising the temperature of the welding element back to the first temperature while the cooling system continues to simultaneously cool the heated welding element;
placing the material to be welded into the welding machine;
initiating welding of the material while both of the heating and the cooling of the welding element is occurring;
continuing to heat the welding element;
switching the cooling system off after one of the following steps occurs:
  a) a pre-determined temperature is reached;
  b) welding of some of the material has taken place and a different pre-determined temperature is reached; and then
continuing to weld the material while continuing to heat the welding element and until welding of the material is completed.

* * * * *